(12) United States Patent
Bostick et al.

(10) Patent No.: US 10,114,815 B2
(45) Date of Patent: Oct. 30, 2018

(54) CORE POINTS ASSOCIATIONS SENTIMENT ANALYSIS IN LARGE DOCUMENTS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

(21) Appl. No.: 15/333,581

(22) Filed: Oct. 25, 2016

(65) Prior Publication Data

US 2018/0113855 A1 Apr. 26, 2018

(51) Int. Cl.
G06F 17/00 (2006.01)
G06F 17/27 (2006.01)

(52) U.S. Cl.
CPC ........ G06F 17/2785 (2013.01); G06F 17/274 (2013.01); G06F 17/2705 (2013.01); G06F 17/278 (2013.01)

(58) Field of Classification Search
CPC .................................................. G06F 17/2785
See application file for complete search history.

(56) References Cited

U.S. PATENT DOCUMENTS

| | | | |
|---|---|---|---|
| 6,424,362 B1 | 7/2002 | Bornstein et al. | |
| 7,644,088 B2* | 1/2010 | Fawcett | G06F 17/30286 704/227 |
| 7,865,354 B2 | 1/2011 | Chitrapura et al. | |
| 8,356,025 B2* | 1/2013 | Cai | G06F 17/2785 707/708 |
| 8,868,405 B2 | 10/2014 | Kasravi et al. | |
| 9,009,024 B2* | 4/2015 | Zhang | G06F 17/2785 704/10 |
| 9,134,215 B1* | 9/2015 | Vignisson | G06N 5/04 |
| 9,436,663 B2* | 9/2016 | Hailpern | G06F 17/24 |

(Continued)

OTHER PUBLICATIONS

Zhong et al; Effective Pattern Discovery for Text Mining, IEEE Transactions on Knowledge and Data Engineering, vol. 24, No. 1, Jan. 2012.

(Continued)

*Primary Examiner* — Amelia Tapp

(74) *Attorney, Agent, or Firm* — Garg Law Firm, PLLC; Christopher K. McLane

(57) ABSTRACT

A set of core points is aggregated from a set of points extracted from a large document. A point and a core point each is a topic covered in the document. For the core point in the set of core points, a network of associations is constructed, where an association in the network includes an entity that has a relationship with the core point by virtue of having contributed data in the document that relates to the core point. From the contributed data, a sentiment value of the contributed data is computed, the sentiment value being indicative of a sentiment of the entity towards the core point. From a set of sentiment values corresponding to the associations in the network of associations, an overall sentiment value is computed for the core point. The overall sentiment values for each core point in the document is reported.

20 Claims, 5 Drawing Sheets

(56) References Cited

U.S. PATENT DOCUMENTS

| | | |
|---|---|---|
| 9,436,674 B2 * | 9/2016 | O'Neil ................ G06F 17/2765 |
| 9,449,080 B1 * | 9/2016 | Zhang ............... G06F 17/30657 |
| 9,772,996 B2 * | 9/2017 | Sheafer ............... G06F 17/2785 |
| 2003/0130837 A1 | 7/2003 | Batchilo et al. |
| 2008/0229187 A1 | 9/2008 | Mahoney et al. |
| 2009/0216524 A1 * | 8/2009 | Skubacz ............. G06F 17/2785 704/9 |
| 2012/0296845 A1 * | 11/2012 | Andrews ................ G06Q 40/06 705/36 R |
| 2014/0012863 A1 | 1/2014 | Sundaresan et al. |
| 2015/0066537 A1 | 3/2015 | Sheffer et al. |
| 2015/0106157 A1 | 4/2015 | Chang et al. |
| 2016/0085740 A1 * | 3/2016 | Ikawa ................... G10L 15/063 704/9 |

OTHER PUBLICATIONS

Thompson, Massachusetts Senate passes public records reform bill, The daily free press, Feb. 9, 2016.

\* cited by examiner

CORE POINTS ASSOCIATIONS SENTIMENT ANALYSIS IN LARGE DOCUMENTS

TECHNICAL FIELD

The present invention relates generally to a method, system, and computer program product for machine analysis of large documents. More particularly, the present invention relates to a method, system, and computer program product for core points associations sentiment analysis in large documents.

BACKGROUND

Hereinafter, a "large document" is a document or data, arranged in any suitable representation, and including the following features—(i) covering a plurality of topics and subtopics, referred to herein as points or core points; (ii) including multiple linguistically similar, equivalent, or parallel representations of a point; (iii) having multiple participating entities related to a point; and (iv) containing a volume of data equivalent of at least tens of pages of a published paperback book. Some examples of large documents include, but are not limited to the drafts of bills presented in a legislative body, software product documentation, and feature specifications document in product development. Hereinafter, any reference to a "document" is a reference to a large document unless expressly distinguished where used.

A point is a topic or a subtopic used to categorize, classify, or otherwise segment a discussion in a document from another discussion in the document. A point may be, but need not be expressly specified or called out in the document, such as in the form of a title or other similarly purposed notation. In many cases, a point is simply a subject-matter that is discussed in a portion of the document.

A core point is a point that represents a subject-matter distinctly from all other points in the document. For example, a document may have several points which are variations of one another. A single point that is representative of such several points is a core point. A point that has a singular occurrence in the document, and where the document does not have any other point that can be regarded as a variant, equivalent, or parallel of the point, can also be regarded as a core point.

SUMMARY

The illustrative embodiments provide a method, system, and computer program product. An embodiment includes a method that aggregates, from a set of points extracted from a large document, a set of core points, a point and a core point each being a topic covered in the document. The embodiment constructs, for the core point in the set of core points, a network of associations, wherein an association in the network comprises an entity that has a relationship with the core point by virtue of having contributed data in the document that relates to the core point. The embodiment computes, from the contributed data a sentiment value of the contributed data, the sentiment value being indicative of a sentiment of the entity towards the core point. The embodiment computes from a set of sentiment values corresponding to the associations in the network of associations, an overall sentiment value for the core point. The embodiment reports overall sentiment values for each core point in the document.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
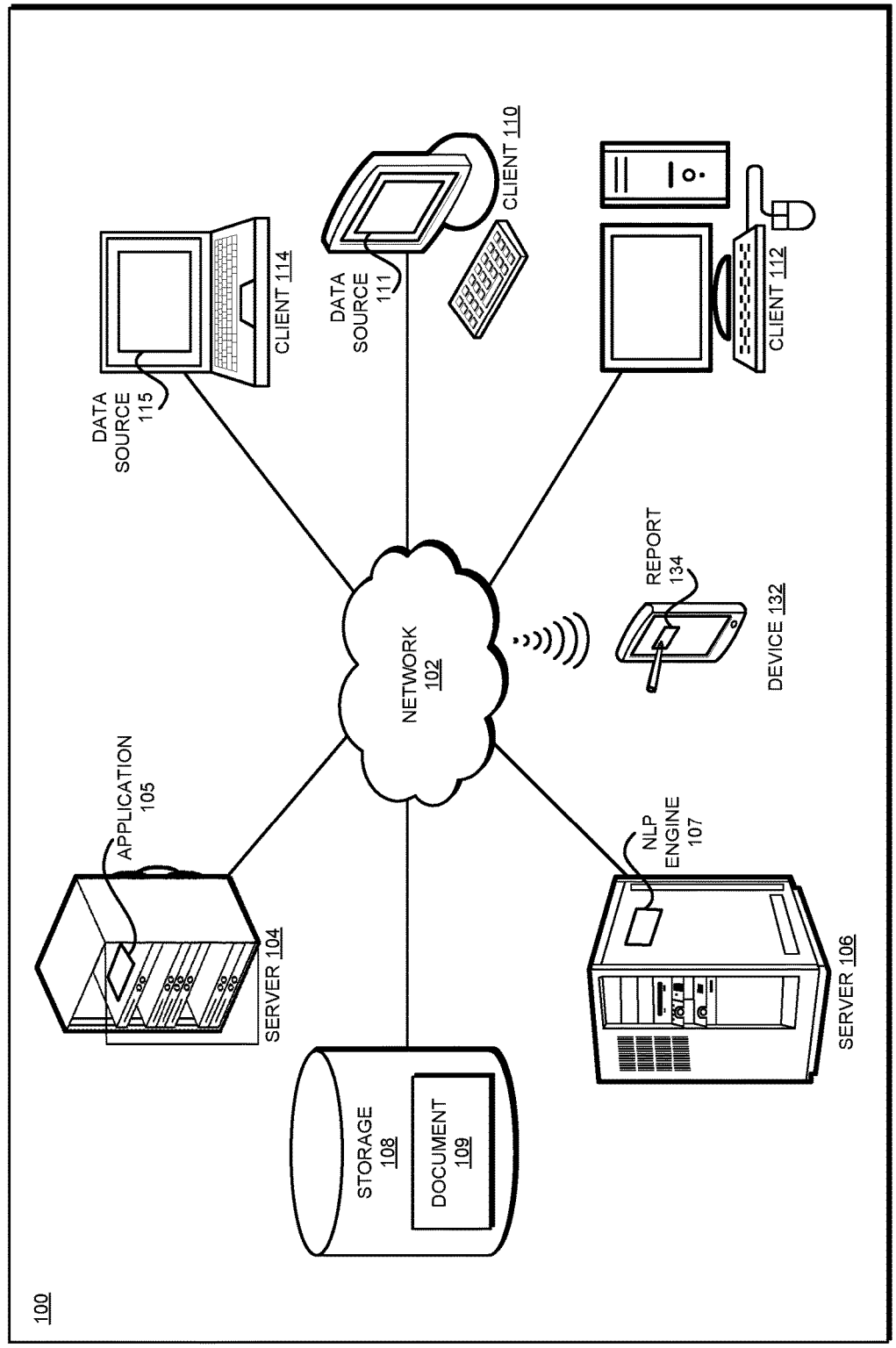
FIG. 1 depicts a block diagram of a network of data processing systems in which illustrative embodiments may be implemented.

The illustrative embodiments recognize that comprehending large documents is itself a daunting task for humans. In many cases, the points being made in the document are difficult to extract from the extraneous data in the document. For example, a product documentation may begin with an introduction to the company, sprinkle marketing material for cross-selling other products throughout the document, and end with a lengthy discussion of the add-ons to the product. In the mix of such data lies a set of points—which may be clearly identified by titles, or not.

Natural Language Processing (NLP) of human readable documents for extracting salient information is possible using the presently available NLP technology. Machine-reading and understanding of written documents for extracting the key concepts or discover patterns is presently used in text mining.

The illustrative embodiments recognize that even when the points can be extracted, the numerosity of the points in a large document can be overwhelming. As is often the case, the numerosity of the points includes repetitive points, i.e., the same point stated in different ways, using different words or phrases, in different contexts, by different participants, in different sections of the document, or some combination thereof.

The illustrative embodiments further recognize that often, different participants have different views on a point. One participant may favor the point, another participant may favor the point more strongly, and another participant may oppose the point. Furthermore, participant opinions can be just as scattered throughout the document as the point itself. It is a difficult problem to understand whether there is a net favorable or net unfavorable sentiment over a point in the document, and by how much.

The illustrative embodiments recognize that this problem is further exacerbated when participants comment on the point—directly or indirectly—in conversations outside the document. For example, a proponent of a bill may make comments on a provision in the bill—a point—in a rally speech. It is a difficult problem to adjust the proponent's sentiment on the point in view of the speech that occurs outside the document? Similarly, suppose that a group interested in defeating the same point is forming alliances or associations and putting out messages in social media. It is a difficult problem to know which of these alliances and/or the interest group are related to some entity that participates in the document on some point. It is a difficult problem to determine how the sentiment on the point is affected by such associations and entities that are external to the document, removed from the participants in the document, but exert influence and affect sentiments on a point in the document through communications outside the document.

These types of problems arise in legislative activities and in many other areas. For example, a number of customers of a product desire a number of features. They express their desires, favorability, unfavorability towards the presently available features and/or expected features of the products in a variety of forums. It is a difficult problem to analyze the relationships in a network of associations between the customers, industry groups, testers, competitors, and others that exists behind each feature—the point. It is a difficult problem to compute a net sentiment associated with the point given this network of associations behind the point. It is a difficult problem to determine a shift in the sentiment as communications progress outside of the feature specification—the document.

The illustrative embodiments recognize that the presently available tools or solutions do not address these needs or provide adequate solutions for these needs. The illustrative embodiments used to describe the invention generally address and solve the above-described problems and other problems related to core points associations sentiment analysis in large documents.

An embodiment can be implemented as a software application. The application implementing an embodiment can be configured as a modification of an existing document analysis system, as a separate application that operates in conjunction with an existing document analysis system, a stand-alone application, or some combination thereof.

An embodiment analyzes a large document to extract a set of points from the document. The analysis can use an existing technique, such as NLP, for the extraction. The extracted set of points forms a summary of the document, and may include one or more variants of one or more points as described herein.

An embodiment further aggregated the points. Particularly, the embodiment identifies a set of points which are variants of one another. For example, the embodiment selects a subset of points in which all member points except one member point are linguistic variants of the one member point. The embodiment uses a dictionary, a thesaurus, an ontology, a lemmatization, and other techniques to identify a point that is a variant of another point. Aggregating points in this manner results in a set of core points corresponding to the document.

An embodiment parses a core point to determine the components of the core point. For example, deep parsing in NLP breaks a sentence down into Noun phrases and verb phrases and determines the prepositional phrase to construct triples. A triple is a structure with three values [subject, predicate, object]. Each value in the triple forms a component of the core point.

An embodiment further analyzes the document to determine associations of entities participating in the document and one or more components of a core point. For example, if the document is a features wish-list for a product, the analysis determines which entity—e.g., which customer, industry group, user, or others—has some relationship with a component of a core point—e.g., a wished-for feature in the document.

For example, the wished-for feature core point may be "xyz interface should integrate with abc library." The components of this core point are [xyz interface, interface, abc library]. In the document, a customer entity may be related to this core point by either being a customer of xyz product, an owner or subscriber of the abc library, or by being a customer where an integration issue came up, according to the document. For example, the document may include a use-case from the customer describing the integration issue.

An entity can be directly or indirectly related to a core point. For example, an entity—such as the example customer in the above example—can be directly related to a core point by having an express relationship in the document with some component of the core point.

An entity can be indirectly by having some relationship in the document with another entity that is directly or indirectly related to some component of the core point. For example, a downstream client of the customer may be an entity that is indirectly related to the wished-for feature because the downstream client did not ask for or comment on the feature, but is affected if the integration feature works (or does not work). The downstream client is therefore an indirect association of the core point by virtue of being related to the customer who is a direct association of a component of the core point.

Operating in this manner, and based on the document itself, the embodiment initially constructs a network of associations behind each core point. An entity participating in the network may be related to other entities outside the document as well where those relationships can have an effect on the core point. For example, the customer may comment in an industry blog about the product. The downstream client of the customer may publish a case study or may be featured in a case study published in a publication, discussed in social media, or explained in a conference. Each such data source outside the document can provide data related to a core point and an entity that participates in the core point's network of associations. Any number and types of such data sources can provide streams of such data.

An embodiment analyzes a data stream from a data source to determine whether the stream includes data that corresponds to a core point from the document. If some data in a stream corresponds to a core point, the embodiment further determines the entities that are related to the core point in the stream. Some, all, or none of these entities may already exist in the network of associations constructed for the core point from the document. The embodiment creates new associations, manipulates existing associations, or both, based on the entities discovered in a data stream.

An embodiment computes a sentiment value for each association. For example, when an entity is determined to be related to a core point either directly or indirectly, whether in the document or in an external data stream, the relationship is expressed in sentences that can be analyzed for the sentiment contained in those sentences. Sentiment analysis is available as a part of NLP techniques.

The embodiment assigns a sentiment weight to each association. In other words, when an entity is related to a component of a core point, the embodiment determines a degree of favorable or unfavorable sentiment expressed by the entity towards the component of the core point. Thus, a link in the network of associations behind a core point can have one or more sentiment values associated therewith.

Multiple sentiment weights can be combined in any suitable manner, such as but not limited to by averaging or computing a statistical mean, to yield a single sentiment weight of an association. The entire network or a portion thereof can be analyzed to determine a net sentiment in that network or the portion thereof.

Furthermore, an embodiment stores past sentiment values expressed by an entity in the network for historical tracking and trending. For example, an entity may be supportive of a core point at one time, become unsupportive of the core point at another time, and become supportive again at a different sentiment value at a third time. The sentiment trending of the entity can reveal fluctuations in the favorability of the core point, reliability of the entity towards the core point, and many other characteristics.

Those of ordinary skill in the art will appreciate that a collection of large documents can easily include dozens if not hundreds of large documents; a large document can have hundreds of core points; each core point can have several components; each core point or its components can have a vast network of associations behind them; and each association can have one or more sentiment values associated therewith. Furthermore, the network of associations and the sentiments therein do not remain static. As data streams are generated, more associations and sentiment weights may be created and existing associations or sentiment weights may be changed or removed. This manner of data analysis pertaining to large documents quickly becomes out of question through manual efforts.

An embodiment accepts an input parameter for report generation. For example, the reporting parameter may specify that the report contain a net sentiment for one or more core points of the document. As another example, the reporting parameter may specify that the report contain a sentiment history of one or more core points of the document. As another example, the reporting parameter may specify that the report contain a sentiment history of one or more entities in the network of associations of a core point of the document.

These examples of reporting parameters and the resulting reports are not intended to be limiting. From this disclosure, those of ordinary skill in the art will be able to conceive many other parameters to configure different reports in a similar manner and the same are contemplated within the scope of the illustrative embodiments.

The manner of core points associations sentiment analysis in large documents described herein is unavailable in the presently available methods. A method of an embodiment described herein, when implemented to execute on a device or data processing system, comprises substantial advancement of the functionality of that device or data processing system in understanding not only the core points of a document but the ongoing and ever-changing sentiment towards those core points from entities that are directly or indirectly related to the components of those core points.

The illustrative embodiments are described with respect to certain types of large documents, points and core points, point components, associations, entities, direct and indirect relationships, sentiment values, reporting parameters, reports, analyses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
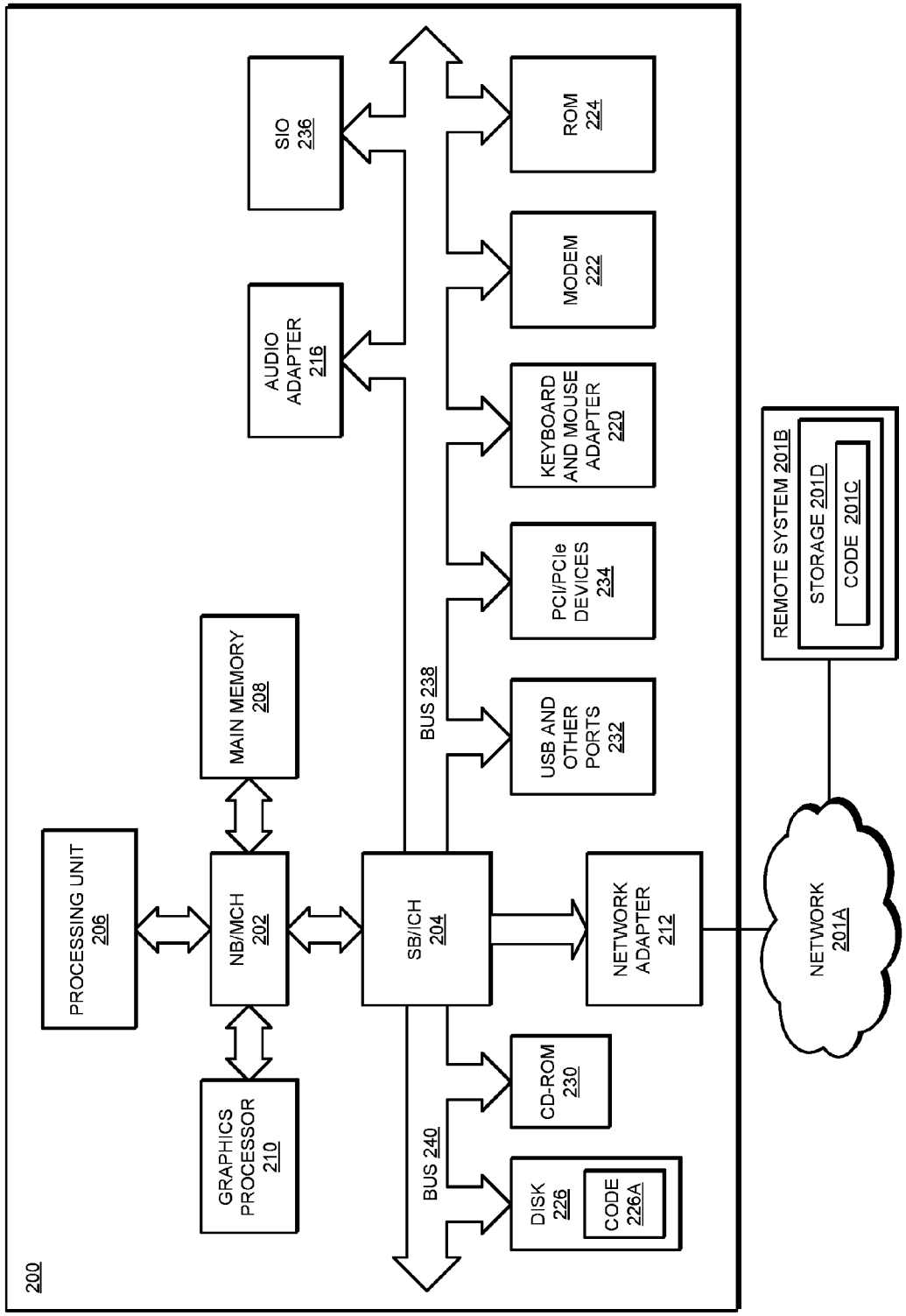
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 analyzes document 109, e.g., using NLP engine 107, in a manner described herein. Application 105 analyzes data streams from data sources 111 and 115 to determine entities participating in a network of association, and their sentiments, in a manner described herein. Application 105 produces report 134 from the network of associations.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
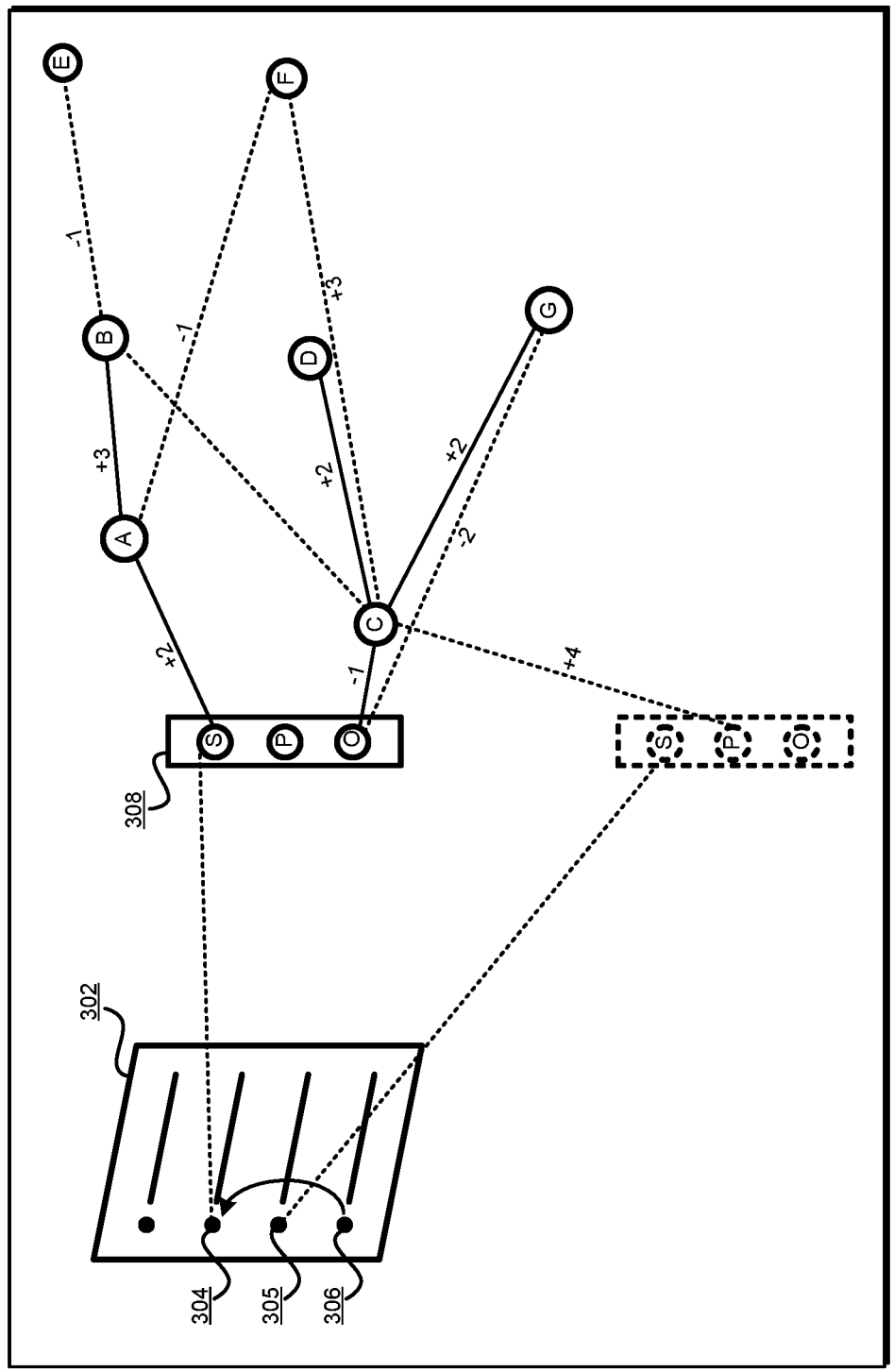
FIG. 3 depicts a block diagram of an example network of associations constructed in accordance with an illustrative embodiment.

With reference to FIG. 3, this figure depicts a block diagram of an example network of associations constructed in accordance with an illustrative embodiment. Document 302 is a large document and is an example of document 109 in FIG. 1.

Suppose that an embodiment described herein has summarized document 302 into a set of points. Points 304, 305, and 306 are example points. Aggregation according to an embodiment determines that point 304 is a variant of point 306 and combined point 304 with point 306, making point 306 a core point as described herein.

An embodiment parses core point 306 into triple 308, comprising subject S, predicate P, and object O. An embodiment analyzes document 302 to identify entities A and C as directly associated with the components of core point 306. The analysis of document 302 and/or one or more data streams such as streams 111 or 115 in FIG. 1 also finds that entity B is related to entity A in the context of core point 306, entity D is related to entity C in the context of core point 306, entity E is related to entity B in the context of core point 306, entity F is related to entities A and C in the context of core point 306, and entity G is related to core point 306 as well as entity C in the context of core point 306.

As described herein, an entity that has a relationship to a core point has a sentiment relative to that core point. Only for simplification and clarity and not to imply any limitation on the illustrative embodiments, assume that sentiment weights are positive for supportive and negative for unsupportive sentiments. Further assume that the sentiment weights are whole values on a o to +/−5 range. In the depicted non-limiting example, entity A is shown to be directly supportive of core point 306 with a sentiment weight of +2; entity B is indirectly supportive of core point 306 by being supportive of entity A's support of core point 306 with a sentiment weight of +3; and entity E is indirectly unsupportive of core point 306 outside document 302 by being unsupportive of entity B's indirect support of core point 306 with a sentiment weight of −1.

Similarly, entity C is directly unsupportive of core point 306 with a sentiment weight of −1; entities D and G are indirectly unsupportive of core point 306 by being supportive of entity C's direct non-support of core point 306 with a sentiment weight of +2; entity G is also indirectly unsupportive of core point 306 by being unsupportive of core point 306 outside document 302 with a sentiment weight of −2; and so on.

An entity can have different sentiments and support for different entities or core points of the same document in direct and indirect relationships. For example, entity F is outside document 302, such as in a data stream, indirectly opposed to entity A's support and indirectly supportive of entity C's non-support. Entity C is unsupportive of core point 306 but is supportive of core point 305 in document 302.

Figure 4:
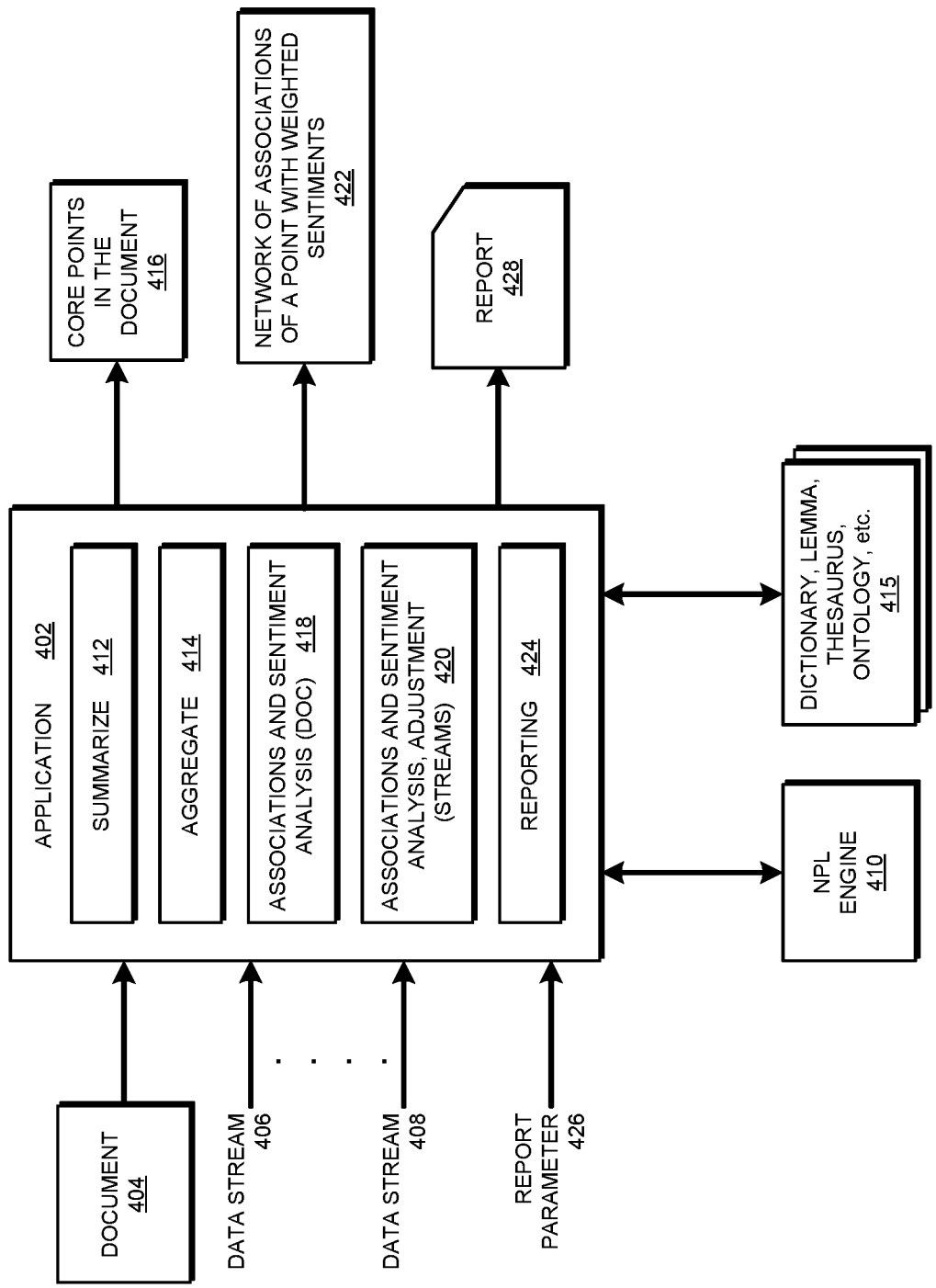
FIG. 4 depicts a block diagram of an example configuration for core points associations sentiment analysis in large documents in accordance with an illustrative embodiment.

With reference to FIG. 4, this figure depicts a block diagram of an example configuration for core points associations sentiment analysis in large documents in accordance with an illustrative embodiment. Application 402 is an example of application 105 in FIG. 1. Document 404 is an example of document 302 in FIG. 3. Data streams 406-408 are any number and types of data streams, similar to any of data streams 111 and/or 115 in FIG. 1. NLP engine 410 is an example of NLP engine 107 in FIG. 1.

Component 412 summarizes document 404 by extracting a set of points from document 404. Component 414 aggregates a subset of similar or variant points into a single core point. As some non-limiting examples, component 414 uses resource 415, which can include any combination of dictionary, lemma, thesaurus, ontology, and other such resources that help determine whether two words or phrases are linguistic equivalents or variants of one another. The set of core points thus aggregated from the set of points can be produced as output 416.

Component 418 analyzes document 404 to determine direct and indirect associations of a core point. Component 418 identifies the entities that are associated with a core point and the sentiment they are expressing towards the core point in the document.

Component 420 analyzes one or more data streams 406-408 to determine direct and indirect associations of a core point. Component 420 identifies the entities that are associated with a core point and the sentiment they are expressing towards the core point in the stream. Different instances of component 420 can be created for analyzing different types of data streams. The network of sentiment weighted associations can be produced as output 422.

Component 424 accepts report parameter 426. Component 424 creates report 428 from sentiment weighted network 422.

Figure 5:
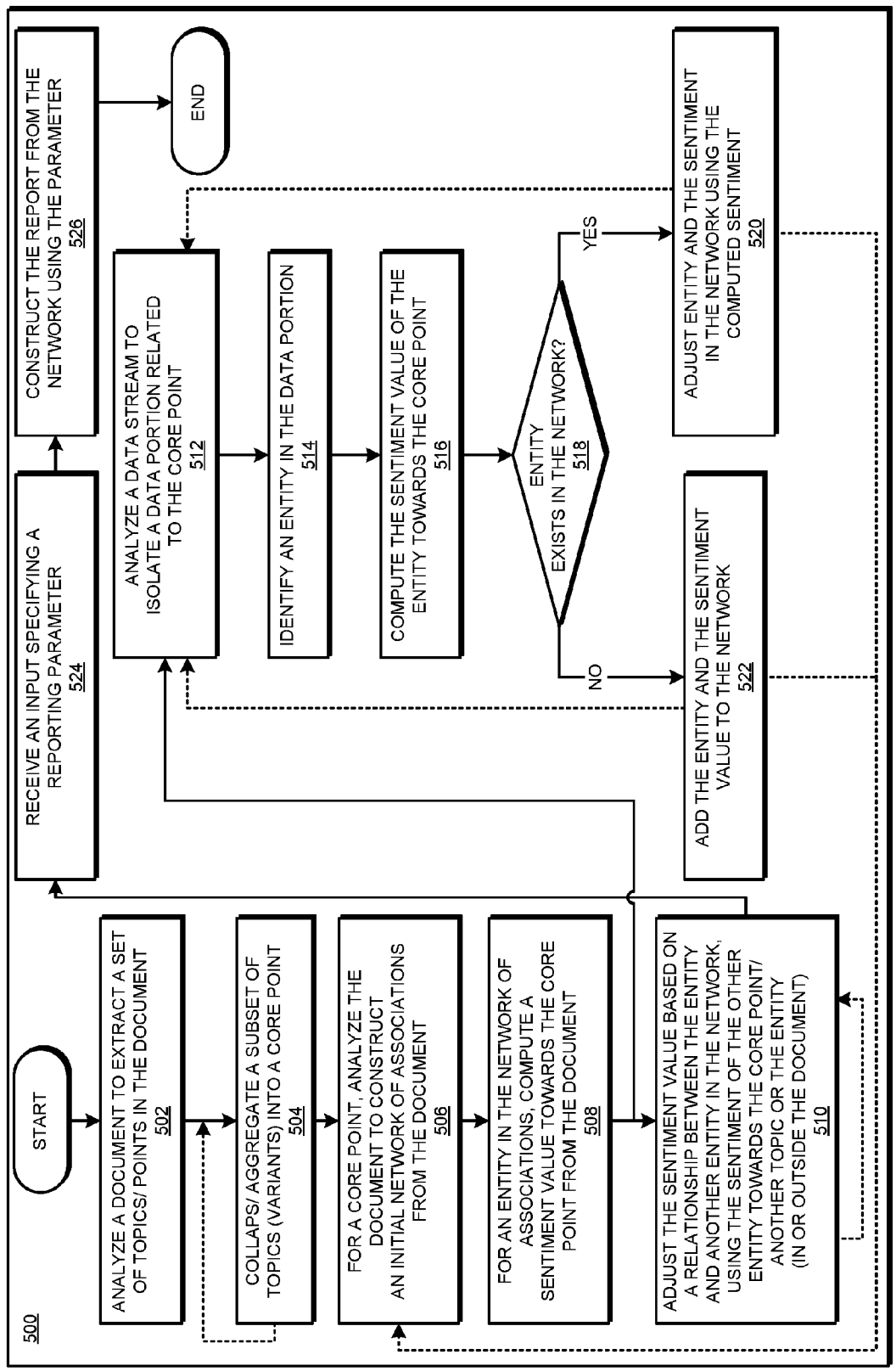
FIG. 5 depicts a flowchart of an example process for core points associations sentiment analysis in large documents in accordance with an illustrative embodiment.

With reference to FIG. 5, this figure depicts a flowchart of an example process for core points associations sentiment analysis in large documents in accordance with an illustrative embodiment. Process 500 can be implemented in application 402 in FIG. 4.

The application analyzes a large document to extract a set of points in the document (block 502). The application collapses or aggregates a subset of points into a core point (block 504). The application repeats the aggregation as many times and for as many subsets as may exist of variants of different core points.

For a core point, the application analyzes the document to construct an initial network of associations from the document (block 506). For an entity in the network, the application computes from the document a sentiment value or weight that the entity is exhibiting towards the core point (block 508).

The application adjusts the sentiment value based on a relationship between the entity and another entity in the network by using a sentiment value of the other entity towards the entity, the core point, or another point in or outside the document (block 510). The application repeats block 510 as many times as needed to compute all adjustments based on the relationships existing in the network.

The application also analyzes a data stream to isolate a data portion from the stream where the portion relates to the core point (block 512). The application identifies an entity in the portion (block 514). The application computes from the portion a sentiment value of the entity towards the core point (block 516). The application determines whether the entity already exists in the network of associations (block 518). If the entity exists ("Yes" path of block 518), the application adjusts the entity's relationship and/or the sentiment of the entity using the computed sentiment from block 516 (block 520).

If the entity does not exist in the network ("No" path of block 518), the application adds the entity and the computed sentiment value in the network (block 522). The application repeats blocks 512-522 as needed for as many streams are processed, as many portions and entities are identified, and as many sentiment values are computed as needed in a given implementation.

After a network of associations has been sufficiently developed and sentiment weighted, blocks 510, 520, and 522, the application proceeds to receive an input specifying a reporting parameter (block 524). The application constructs the report from the network (block 526). The application ends process 500 thereafter.

Thus, a computer implemented method, system or apparatus, and computer program product are provided in the illustrative embodiments for core points associations sentiment analysis in large documents and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   aggregating, from a set of points extracted from a large document, a set of core points, a point and a core point each being a topic covered in the document;
   constructing, for the core point in the set of core points, a network of associations, wherein an association in the network comprises an entity that has a relationship with the core point by virtue of having contributed data in the document that relates to the core point;
   computing, from the contributed data a sentiment value of the contributed data, the sentiment value being indicative of a sentiment of the entity towards the core point;
   analyzing a data stream from a data source other than the document to isolate a portion of data stream that relates to the core point;
   identifying a second entity in the portion of the data stream, wherein the second entity contributes the portion of the data stream that relates to the core point;
   computing, from the portion of the data stream that relates to the core point, a second sentiment value of the second entity towards the core point;
   determining that the second entity does not exist in the network of associations;

adding, responsive to determining that the second entity does not exist in the network of associations, the second entity and the second sentiment value to the network of associations;
computing from a set of sentiment values corresponding to the associations in the network of associations, an overall sentiment value for the core point; and
reporting overall sentiment values for each core point in the document.

2. The method of claim 1, further comprising:
analyzing the document to identify a first set of entities, wherein the entities in the first set of entities participate in the document relative to the core point, the entities from first set of entities being used in the network of associations.

3. The method of claim 2, wherein a first entity in the first set of entities has a direct relationship with the core point when the first entity contributes data in the document relative to a component of the core point.

4. The method of claim 3, wherein a second entity in the first set of entities has an indirect relationship with the core point when the second entity contributes data in the document relative to the first entity.

5. The method of claim 4, further comprising:
analyzing the data stream from the data source other than the document to identify a second set of entities, wherein the entities in the second set of entities contribute a portion of the data stream relative to the core point, the entities from the second set of entities being used in the network of associations.

6. The method of claim 5, wherein the portion of the data stream is relative to another entity wherein the other entity has contributed data relative to the core point.

7. The method of claim 1, further comprising:
selecting from the set of points a subset of points, the points in the subset of points being linguistic variants of each other; and
correlating, as a part of the aggregating, the points in the subset of points with a single point in the subset, the single point forming the core point.

8. A computer usable program product comprising one or more computer-readable storage devices, and program instructions stored on at least one of the one or more storage devices, the stored program instructions comprising:
program instructions to aggregate, from a set of points extracted from a large document, a set of core points, a point and a core point each being a topic covered in the document;
program instructions to construct, for the core point in the set of core points, a network of associations, wherein an association in the network comprises an entity that has a relationship with the core point by virtue of having contributed data in the document that relates to the core point;
program instructions to compute, from the contributed data a sentiment value of the contributed data, the sentiment value being indicative of a sentiment of the entity towards the core point;
program instructions to analyze a data stream from a data source other than the document to isolate a portion of data stream that relates to the core point;
program instructions to identify a second entity in the portion of the data stream, wherein the second entity contributes the portion of the data stream that relates to the core point;
program instructions to compute, from the portion of the data stream that relates to the core point, a second sentiment value of the second entity towards the core point;
program instructions to determine that the second entity does not exist in the network of associations;
program instructions to add, responsive to determining that the second entity does not exist in the network of associations, the second entity and the second sentiment value to the network of associations;
program instructions to compute from a set of sentiment values corresponding to the associations in the network of associations, an overall sentiment value for the core point; and
program instructions to report overall sentiment values for each core point in the document.

9. The computer usable program product of claim 8, further comprising:
program instructions to analyze the document to identify a first set of entities, wherein the entities in the first set of entities participate in the document relative to the core point, the entities from first set of entities being used in the network of associations.

10. The computer usable program product of claim 9, wherein a first entity in the first set of entities has a direct relationship with the core point when the first entity contributes data in the document relative to a component of the core point.

11. The computer usable program product of claim 10, wherein a second entity in the first set of entities has an indirect relationship with the core point when the second entity contributes data in the document relative to the first entity.

12. The computer usable program product of claim 11, further comprising:
program instructions to analyze the data stream from the data source other than the document to identify a second set of entities, wherein the entities in the second set of entities contribute a portion of the data stream relative to the core point, the entities from the second set of entities being used in the network of associations.

13. The computer usable program product of claim 12, wherein the portion of the data stream is relative to another entity wherein the other entity has contributed data relative to the core point.

14. The computer usable program product of claim 8, further comprising:
program instructions to select from the set of points a subset of points, the points in the subset of points being linguistic variants of each other; and
program instructions to correlate, as a part of the aggregating, the points in the subset of points with a single point in the subset, the single point forming the core point.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to aggregate, from a set of points extracted from a large document, a set of core points, a point and a core point each being a topic covered in the document;

program instructions to construct, for the core point in the set of core points, a network of associations, wherein an association in the network comprises an entity that has a relationship with the core point by virtue of having contributed data in the document that relates to the core point;

program instructions to compute, from the contributed data a sentiment value of the contributed data, the sentiment value being indicative of a sentiment of the entity towards the core point;

program instructions to analyze a data stream from a data source other than the document to isolate a portion of data stream that relates to the core point;

program instructions to identify a second entity in the portion of the data stream, wherein the second entity contributes the portion of the data stream that relates to the core point;

program instructions to compute, from the portion of the data stream that relates to the core point, a second sentiment value of the second entity towards the core point;

program instructions to determine that the second entity does not exist in the network of associations;

program instructions to add, responsive to determining that the second entity does not exist in the network of associations, the second entity and the second sentiment value to the network of associations;

program instructions to compute from a set of sentiment values corresponding to the associations in the network of associations, an overall sentiment value for the core point; and program instructions to report overall sentiment values for each core point in the document.

18. The computer system of claim 17, further comprising:
    program instructions to analyze the document to identify a first set of entities, wherein the entities in the first set of entities participate in the document relative to the core point, the entities from first set of entities being used in the network of associations.

19. The computer system of claim 18, wherein a first entity in the first set of entities has a direct relationship with the core point when the first entity contributes data in the document relative to a component of the core point.

20. The computer system of claim 19, wherein a second entity in the first set of entities has an indirect relationship with the core point when the second entity contributes data in the document relative to the first entity.

* * * * *